(12) United States Patent
Gaiser et al.

(10) Patent No.: US 6,588,320 B2
(45) Date of Patent: Jul. 8, 2003

(54) PISTON HAVING UNCOUPLED SKIRT

(75) Inventors: Randall R. Gaiser, Chelsea, MI (US); Xiluo Zhu, Ann Arbor, MI (US)

(73) Assignee: Federal-Mogul World Wide, Inc., Southfield, MI (US)

(*) Notice: Subject to any disclaimer, the term of this patent is extended or adjusted under 35 U.S.C. 154(b) by 91 days.

(21) Appl. No.: 09/749,705

(22) Filed: Dec. 27, 2000

(65) Prior Publication Data

US 2001/0029840 A1 Oct. 18, 2001

Related U.S. Application Data

(60) Provisional application No. 60/173,658, filed on Dec. 30, 1999.

(51) Int. Cl.$^7$ .................................................. F16J 1/04
(52) U.S. Cl. ........................................................ 92/231
(58) Field of Search ........................................... 92/231

(56) References Cited

U.S. PATENT DOCUMENTS

| 4,161,165 A | 7/1979 | Belush et al. |
| 4,286,505 A | 9/1981 | Amdall |
| 4,581,983 A | 4/1986 | Moebus |
| 4,989,559 A | 2/1991 | Fletcher-Jones |
| 5,150,517 A | 9/1992 | Martins Leites et al. |
| 5,359,922 A | 11/1994 | Martins Leites et al. |
| 5,394,788 A | 3/1995 | Mendes et al. |
| 5,778,533 A | 7/1998 | Kemnitz |
| 5,778,846 A | 7/1998 | Mielke |
| 5,913,960 A * | 6/1999 | Fletcher-Jones ............... 92/219 |
| 6,032,619 A * | 3/2000 | Zhu et al. ................. 123/41.35 |
| 6,155,157 A | 12/2000 | Jarrett |
| 6,279,455 B1 | 8/2001 | Kruse |

FOREIGN PATENT DOCUMENTS

| DE | 243530 A1 | 4/1987 |
| WO | WO 96/20340 A1 | 7/1996 |

* cited by examiner

Primary Examiner—F. Daniel Lopez
(74) Attorney, Agent, or Firm—Howard & Howard

(57) ABSTRACT

A piston (10) particularly suited for heavy duty diesel engine applications includes upper and lower crown sections (28, 30) joined by a friction weld (32) to define an annular ring belt (14) formed with ring groves (22) and having a lower end (20) and an internal piston cooling chamber (34). A pair of pin bosses (40) depend from the ring belt (14) and are formed as one piece with the lower crown section (30). A skirt (46) is also formed as one piece with the pin bosses (40) and has an upper end (48) that is spaced from the lower end (20) of the ring belt (14) to define a space (52) therebetween which effectively uncouples the skirt (46) from the ring belt (14).

18 Claims, 4 Drawing Sheets

PISTON HAVING UNCOUPLED SKIRT

The disclosure incorporates the monobloc piston disclosed in provisional patent application No. 60/173,658, filed Dec. 30, 1999, whose priority is claimed for this application.

BACKGROUND OF THE INVENTION

1. Technical Field

This invention relates generally to pistons for heavy-duty engine applications.

2. Related Prior Art

Pistons for heavy-duty applications include an upper head formed with a ring belt having pin bosses depending therefrom for connecting the piston to a connecting rod of the engine. Such pistons also include a piston skirt that is formed either as one piece with the head and pin boss portions, or formed as a separate structure which is coupled in articulated fashion to the pin bosses via the wrist pin.

In pistons having a unitized skirt, axial loading from the combustion gases is transmitted through the head to the pin boss section. Since the skirt is coupled directly to the head as an extension of the ring belt, the skirt also sees axial loads. Such unitized skirts also tend to be overly rigid, as they are tied directly to the ring belt as one piece. Such inflexible skirts may make sensitive to scuffing or marking of the skirt and cylinder wall during radial thrust loading of the skirt. U.S. Pat. No. 6,155,157 shows such a piston.

Still a further characteristic of forming the skirt as one piece with the ring belt is that the heat from the head is transmitted directly to the skirt, and thus added clearance must be provided between the skirt and cylinder wall to compensate for thermal expansion of the skirt, sacrificing closeness of fit between the piston skirt and cylinder wall.

A piston constructed according to the present invention overcomes or minimizes the above difficulties associated with monobloc pistons.

SUMMARY OF THE INVENTION AND ADVANTAGES

A piston constructed according to the invention for heavy duty engine applications comprises a piston head having a peripheral ring belt with a lower end and a pair of pin bosses depending from the head portion, each formed with a wrist pin hole. An internal piston cooling gallery is formed in the head and includes a bottom wall coupled to and extending radially inwardly from the ring belt. The piston construction includes a piston skirt coupled directly and immovably to the pin bosses having an upper free end which is spaced in uncoupled relation from the lower end of the ring belt and the bottom wall of the piston cooling gallery.

A method is provided for making such a piston and comprises forming a head portion of the piston having an internal cooling gallery, a peripheral ring belt with a lower end and a pair of depending pin bosses, and unitizing a piston skirt with the pin bosses in direct immovable relation thereto, and having an upper free end of the skirt arranged in spaced uncoupled relation to the lower end of the ring belt.

One advantage offered by such a piston construction is increased flexibility of the skirt, since it is no longer united directly to the ring belt, and thus is free to flex and give under radial loads, thereby decreasing the occurrence of scuffing or marking of the cylinder walls associated with the aforementioned rigid skirts.

Another recognized advantage of uncoupling the skirt from the ring belt is that the intervening space precludes the axial loads imparted to the head by combustion gases from being transmitted to the skirt. Such loads are instead transmitted directly to the pin bosses, isolating the skirt from such axial loads.

Another advantage of the uncoupled skirt configuration is that the intervening space serves as an insulation barrier to prevent direct transmission of heat from the head to the skirt. By isolating the skirt from the heat of the head portion, the skirt is subject to far less thermal expansion and thus can be designed with a closer fit relative to the cylinder wall than the traditional coupled skirts above.

Still another advantage recognized by the subject piston construction is that it requires relatively less material to manufacture and is thus lighter in weight and less costly to produce than traditional monobloc pistons.

THE DRAWINGS

These and other features and advantages of the present invention will become more readily appreciated when considered in connection with the following detailed description and appended drawings, wherein.

DETAILED DESCRIPTION

Figure 1:
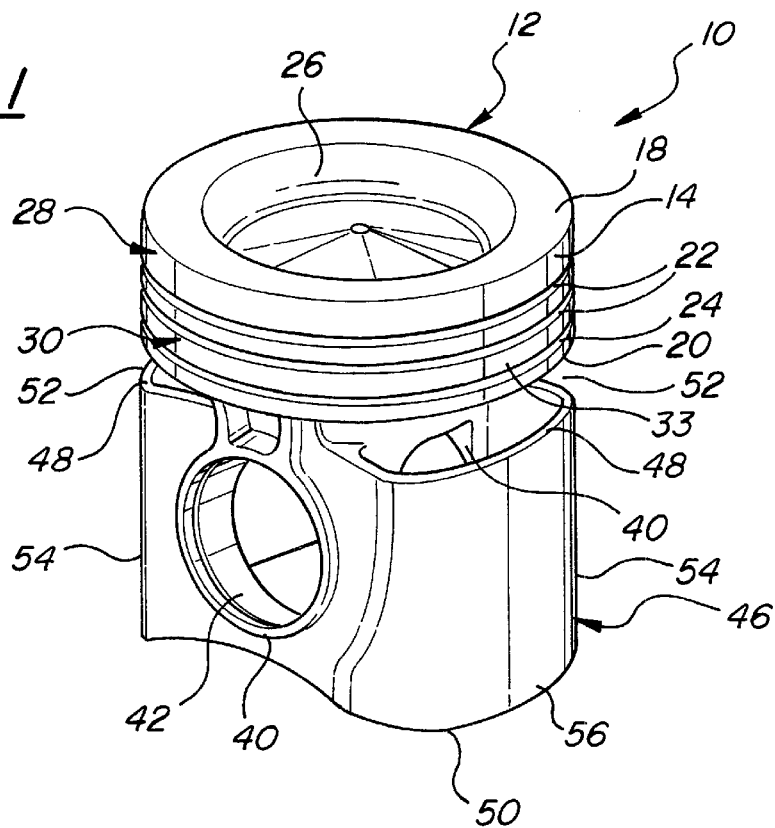
FIG. 1 is an enlarged perspective view of a piston constructed to the invention.
Figure 3:
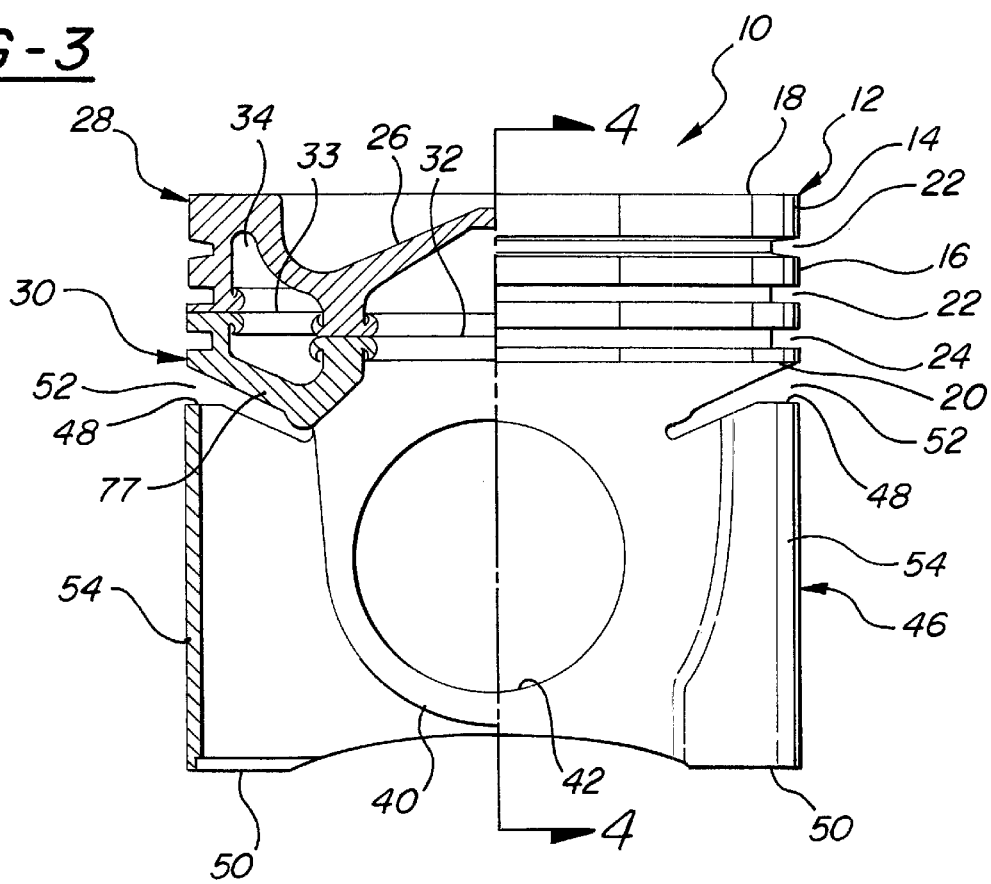
FIG. 3 is an elevational view of the piston of FIG. 1, shown in half section.
Figure 2:
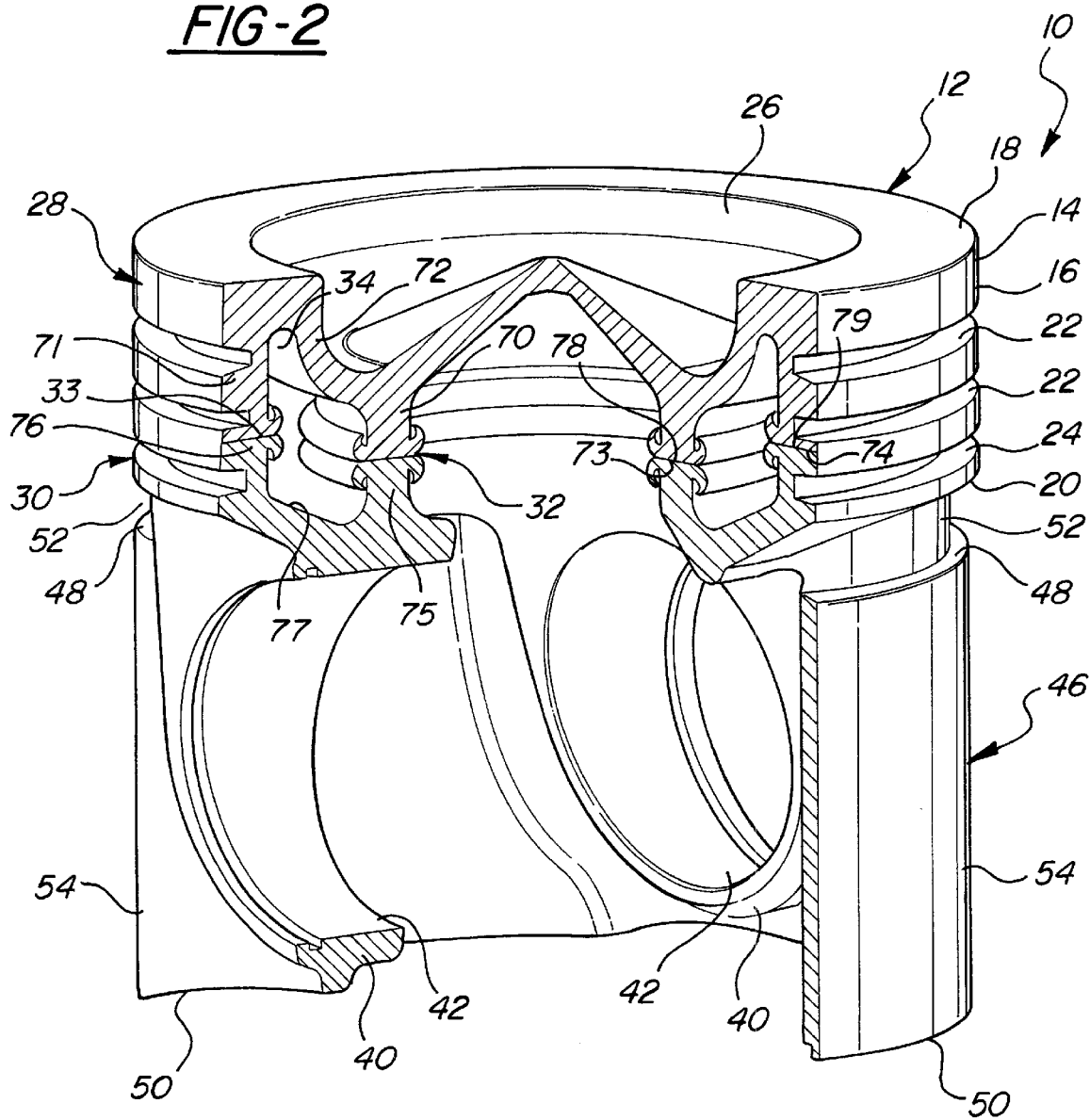
FIG. 2 is an elevational perspective view of the piston of FIG. 1, shown partly in section.
Figure 4:
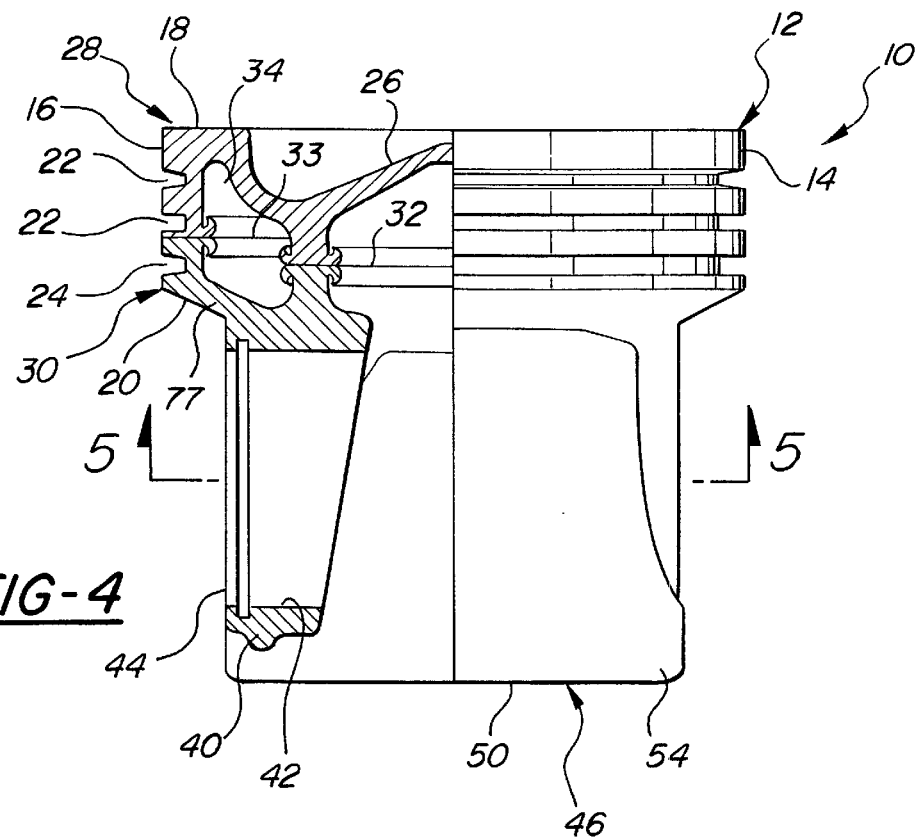
FIG. 4 is a half cross-sectional view taken along lines 4—4 of FIG. 3.

A piston constructed to a presently preferred embodiment of the invention is shown generally at 10 in the drawings and is particularly well suited for use in heavy-duty engine applications.

The piston 10 includes a head portion 12 having an annular ring belt 14 with an outer cylindrical surface 16 of predetermined diameter extending longitudinally of the piston 10 between an upper end 18 and a lower end 20 of the ring belt 14. A plurality of ring grooves 22, 24 are formed in the ring belt 14 for accommodating compression rings and an oil ring, respectively (not shown) in conventional manner. A combustion bowl 26 is formed in the top of the head 12.

Referring to FIGS. 2–4 and FIG. 6, the head portion 12 includes an upper crown section 28 and a lower crown portion or section 30. The upper crown section 28 is formed separately from the lower crown section 30. The upper crown section 28 has an inner annular wall 70 and an outer annular wall 71. The outer annular wall 71 forms part of the ring belt 14. The inner annular wall 70 is spaced radially inwardly from the outer annular wall 71. The walls 70, 71 are bridged at their top by a transverse wall 72 which forms part of the combustion bowl 26. The walls 70, 71 have lower mating surfaces 73, 74 for joining to the lower crown section 30 as will be described below.

The lower crown section 30 has an inner annular wall 75 and an outer annular wall 76. The inner wall 75 is aligned with the inner wall 70 of the upper crown section 28. The outer wall 76 is aligned with the outer wall 71 of the upper crown section 28 and forms part of the ring belt 14. The inner and outer walls 75, 76 are bridged at the bottom by an annular bottom wall 77. The inner and outer walls 75, 76 have upper mating surfaces 78, 79 aligned with the mating surfaces 73, 74. The upper and lower crown sections 28, 30 are joined across these surfaces 75, 76, 78, 79.

The preferred manner of securing the upper and lower crown sections 28, 30 is by friction welding, such that friction weld joints 32, 33 are present at the mating surfaces. While friction welding is the preferred means of joining the crown sections 28, 30 together, other joining processes practiced in the art are contemplated by the invention, including other welding processes, brazing, mechanical interlock, fasteners, etc. As shown best in FIG. 6, joining the crown sections 28, 30 together forms at least one internal chamber or piston cooling gallery 34 provided with passages 36, 38 in the bottom wall 77 extending into the chamber 34 from below to accommodate the flow of cooling oil into and out of the chamber 34 for cooling the head 12 of the piston, particularly in the areas adjacent the combustion bowl 26 and ring belt 14. The bottom wall 77 is coupled to the lower end 28 of the ring belt 14 and extends transversely therefrom radially inwardly where it joins with the inner wall 75, thereby providing a floor that closes the gallery 34 from below, apart from the flow passages 36, 38.

A pair of pin bosses 40 depend from and are formed as one piece of the same material with the lower crown section 30. The pin bosses 40 each have a wrist pin opening or pin bores 42 therein disposed along an axis A for accommodating a wrist pin (not shown) for connecting the piston 10 to a connecting rod (not shown) in known manner. As shown best in FIGS. 4 and 5, it will be seen that the outer edges 44 of the pin bosses 40 are set radially inwardly from the outer surface 16 of the ring belt 14.

The piston 10 also includes a piston skirt 46 which is unitized with the pin bosses 40. By "unitized", it is meant that the skirt 46 is coupled directly and immovably to the pin bosses 40, such that the skirt 46 cannot move relative to the pin bosses 40, including about the axis A of the pin bores 42. It is preferred that the skirt 46 be formed as one piece with the pin bosses 40 out of the same material, such as steel using common processes such as casting or forging. The upper crown section 28 may likewise be cast or forged and is made from a material which may be similar to or different than the lower crown material. In the case of friction welding, the materials selected for the upper and lower crown sections 28, 30 are preferably steel alloys which can support the loads and temperatures of operation and are compatible for friction welding.

The skirt 46 has an upper free end or edge 48 and a lower end 50. The upper free end 48 is spaced about its circumference from the lower end 20 of the ring belt 14 defining a gap or space 52 therebetween. The skirt 46, while coupled to the pin bosses 40, is uncoupled from the ring belt 14 by virtue of the space 52. The upper end 48 is also spaced in uncoupled relation to the bottom wall 77 of the gallery 34. The space 52 is open to the interior of the skirt 46.

Figure 5:
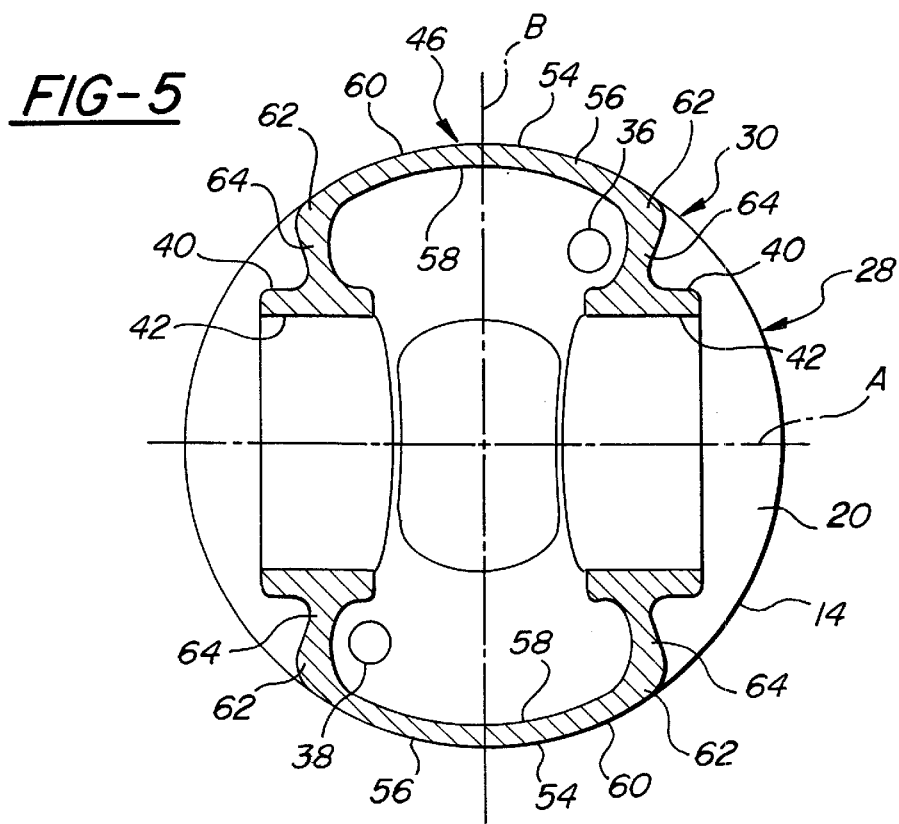
FIG. 5 is a cross-sectional view taken along lines 4—4 of FIG. 4.
Figure 6:
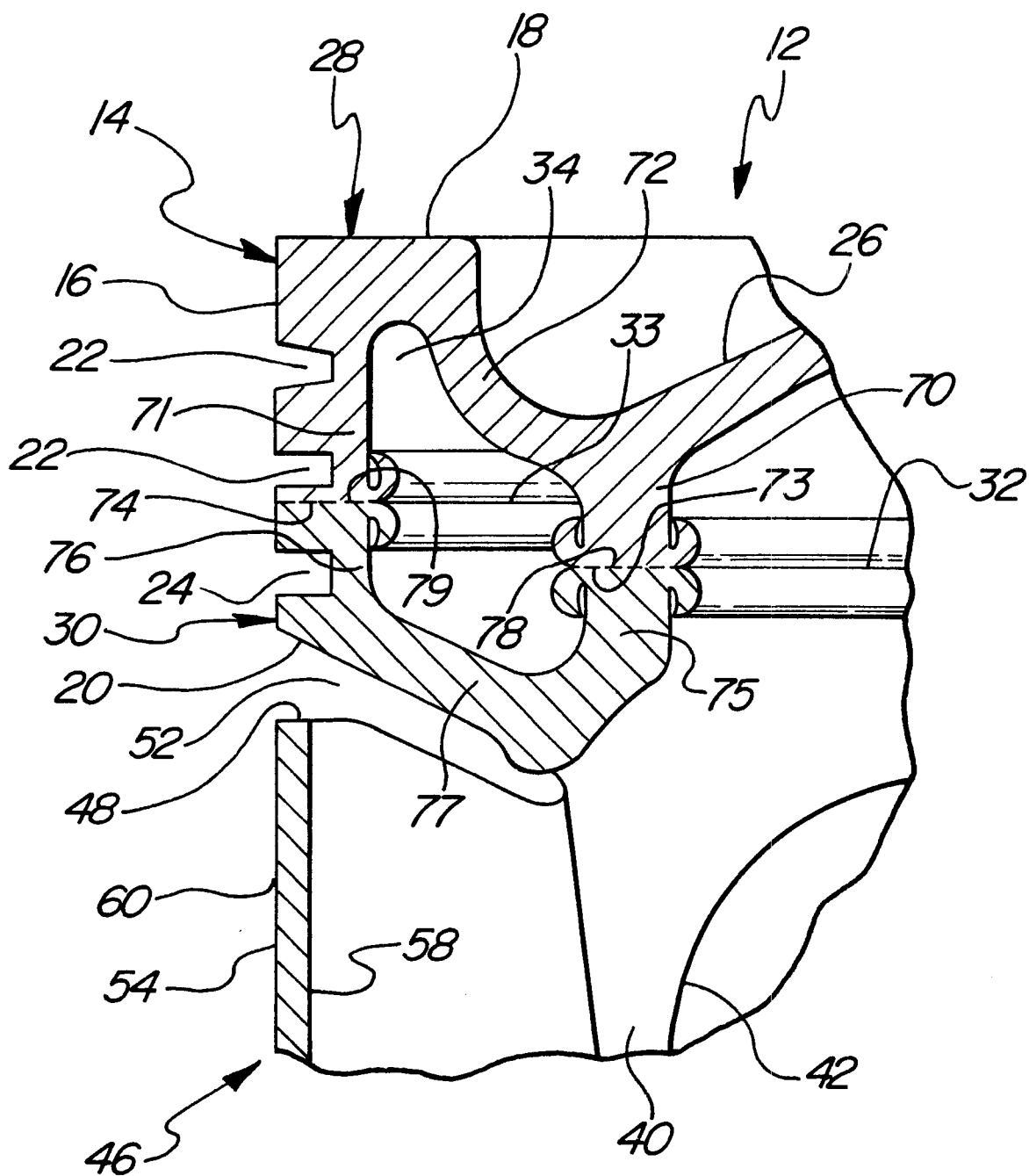
FIG. 6 is an enlarged fragmentary sectional view of a portion of the piston.

As shown best in FIG. 5, the skirt 46 is formed to include two half portions 54 projecting radially outwardly on opposite sides of the pin bosses 40 along an axis B disposed perpendicular to the axis A of the wrist pin openings 42. The skirt portions 54 each have a generally U-shaped configuration in cross section taken in a plane perpendicular to the axis A (FIG. 5). Each skirt portion 54 includes an arcuate wall section 56 having an inner concave surface 58 spaced from the pin bosses 40 and an outer concave surface 60 lying along the path of a circle having the same diameter and concentricity as that of the outer cylindrical surface 16 of the ring belt 14, so as to lie in the same plane as the ring belt 14 and to be continuous therewith but for the intervening space 52. The arcuate wall sections 56 are truncated at their ends 62 and transition into leg portions 64 which extend inwardly in parallel relation to the axis B and are joined to the pin bosses 40 of the piston 10 at their bases. Still referring to FIG. 5, it will be seen that the truncated ends 62 of the skirt 46 extend along the axis A no further than the outer edges 44 of the pin bosses 40. It will also be seen from the Figures that the pin bosses 40 have a wall section of variable width along the axis A that define the wrist pin openings 42, and that the leg portions 64 of the skirt 46 have a width substantially less than that of the pin bosses 40 (FIG. 5) and define, effectively, rigid structural webs supporting the arcuate wall portions 56 of the skirt 46 in radially spaced relation to the pin bosses 40, with the outer surface 60 thereof in longitudinal coplanar alignment with the outer surface 16 of the ring belt 14.

It will be further seen from FIG. 5 that the arcuate wall 56 has a relatively thin cross-section (i.e., about 4–5 mm) and that the transitions at their ends 62 into the leg portions 64 are generously radiused on both the inner and outer surfaces (ranging from about 6–12 mm in radius). It will be seen that the span of the arcuate wall 56 between the leg portions 64 is unsupported and unattached to any other structure of the piston 10. In this manner, the skirt 46, and particularly the arcuate wall section 56, is able to flex radially a certain amount under radial loads so as to prevent or minimize scoring or marking of the skirt and the cylinder walls during the operation.

The exposed upper end 48 of the skirt 46 may beneficially serve to scrape oil off the cylinder wall during operation, allowing it to pass through the space 52 to the interior of the skirt 46 and fall back to the crank case to help reduce oil consumption of the engine.

The piston 10 is preferably fabricated of SAE 4140 steel and is preferably cast in two parts rather than forged, although it may be forged. It will be appreciated that the formation of the space 52 separating the skirt 46 from the ring belt 14 and the numerous reentrant cavities and the thin wall sections, particularly of the skirt 46, are more suitably formed by casting than forging. The separately formed upper crown section 28 may be forged, but is preferably cast and later joined by friction welding or other joining processes to the lower crown section 30.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A piston for an engine, comprising:

a piston head having an upper crown portion, a lower crown portion, and a ring belt portion formed with a plurality of ring grooves and having a lower end, said upper crown portion being formed separately from said lower crown portion, said upper crown portion and said lower crown portion having mutual mating surfaces, said upper crown portion being joined to said lower crown portion across said mating surfaces;

a piston cooling gallery formed within said piston head between said upper crown portion and said lower crown portion, said piston cooling gallery including a bottom wall portion fabricated as one piece with said lower crown and coupled to said ring belt portion adjacent said lower end thereof and extending radially inwardly of said ring belt portion to provide a floor to said piston cooling gallery;

said lower crown including a pair of pin bosses formed with axially aligned pin bores; and a piston skirt fixed immovably to said pin bosses as a unitized structure therewith and having a free upper edge of said piston skirt spaced in uncoupled relation to said ring belt portion and said bottom wall of said piston cooling gallery and open to an interior of said piston skirt.

2. The piston of claim 1 wherein said piston skirt includes a pair of skirt portions formed as one piece of the same material as said pin bosses.

3. The piston of claim 2 wherein said skirt portions are fabricated of steel.

4. The piston of claim 1 wherein an upper section of said ring belt portion is formed as part of said upper crown portion, and a lower section of said ring belt portion is formed as part of said lower crown portion, said lower section including at least one of said plurality of said ring grooves.

5. The piston of claim 1 wherein said upper crown portion includes an annular inner wall spaced radially inwardly from said ring belt portion, and said lower crown portion includes an annular inner wall aligned with said annular inner wall of said upper crown portion, said bottom wall extending transversely between said inner wall of said lower crown portion and said ring belt portion and formed as one piece therewith.

6. The piston of claim 5 wherein said ring belt portion includes a weld joint.

7. The piston of claim 6 wherein said upper edge of said piston skirt is spaced from said weld joint of said skirt portion.

8. The piston of claim 7 wherein said annular inner walls of said upper and lower crown portions are joined by a weld joint.

9. The piston of claim 8 wherein said weld joint comprises a friction weld joint.

10. The piston of claim 7 wherein said weld joint of said ring belt is located between an adjacent pair of said plurality of said ring grooves.

11. The piston of claim 6 wherein said weld joint comprises a friction weld joint.

12. The piston of claim 1 wherein said upper edge of said piston skirt extends above said pin bores of said pin bosses.

13. The piston of claim 1 wherein said upper and lower crown portions are joined by at least one weld joint.

14. The piston of claim 13 wherein said weld joint comprises a friction weld joint.

15. A piston for an engine comprising:

upper and lower crown portions separately formed and joined by at least one friction weld joint to define a piston head having a closed piston cooling gallery formed between the upper and lower crown portions, said piston head having an outer annular ring belt formed with a plurality of piston ring grooves and including a lower end;

said lower crown portion including a pair of depending pin bosses fabricated of a metallic material and formed with aligned pin bores; and a pair of piston skirt portions formed as one unitary piece with said pin bores of the same material as said material of said pin bosses, said skirt portions including upper free edges spaced in uncoupled relation to said lower end of said ring belt and said friction weld joint of said piston head and open to an interior of said skirt portions.

16. A method of forming a piston for an engine, comprising:

forming an upper crown portion;

forming a lower crown portion separately from the upper crown portion;

joining the upper crown portion to the lower crown portion to provide an internal piston cooling gallery between the joined upper and lower crown portions and including a bottom wall of the piston cooling gallery formed as one piece with the lower crown portion, and to provide an outer annular ring belt portion having a lower end coupled to the bottom wall of the piston cooling gallery;

forming the lower crown portion with a pair of pin bosses having aligned pin bores; and forming a piston skirt which is directly and immovably fixed to the pin bosses as unitized structure therewith and including an upper free edge that is spaced in uncoupled relation to the ring belt portion and bottom wall of the piston cooling gallery and open to an interior of the piston skirt.

17. The method of claim 16 including fabricating the piston skirt as one piece with the pin bosses of the same material.

18. The method of claim 16 wherein the upper and lower crown portions are joined by friction welding to provide at least two friction weld joints, and wherein the upper free edge of the piston skirt is spaced from the weld joints.

\* \* \* \* \*